(12) United States Patent  
Pryputniewicz

(10) Patent No.: US 7,487,975 B2  
(45) Date of Patent: Feb. 10, 2009

(54) QUAD PARABOLIC SNOWMOBILE SKI

(76) Inventor: Nicholas D. Pryputniewicz, 318 Tower St., Waterville, NY (US) 13480

( * ) Notice: Subject to any disclaimer, the term of this patent is extended or adjusted under 35 U.S.C. 154(b) by 290 days.

(21) Appl. No.: 11/585,875

(22) Filed: Oct. 25, 2006

(65) Prior Publication Data

US 2007/0090614 A1    Apr. 26, 2007

Related U.S. Application Data

(60) Provisional application No. 60/729,744, filed on Oct. 25, 2005.

(51) Int. Cl.
*B62B 17/02* (2006.01)
(52) U.S. Cl. .................. 280/28; 280/22; 280/22.1
(58) Field of Classification Search ............. 280/28, 280/21.1, 845, 12.1, 28.16
See application file for complete search history.

(56) References Cited

U.S. PATENT DOCUMENTS

| | | | |
|---|---|---|---|
| 3,817,544 A | | 6/1974 | Labelle |
| 3,857,578 A | * | 12/1974 | Alton ................ 280/28 |
| 4,491,333 A | * | 1/1985 | Warnke ............... 280/28 |
| 5,040,818 A | | 8/1991 | Metheny |
| 5,104,140 A | | 4/1992 | Anderson |
| 5,145,195 A | | 9/1992 | Campbell et al. |
| 5,165,709 A | * | 11/1992 | Jacques .............. 280/28 |
| 5,303,949 A | | 4/1994 | Harper et al. |
| 5,344,168 A | * | 9/1994 | Olson et al. ........... 280/28 |
| 5,599,030 A | | 2/1997 | Campbell et al. |
| 5,700,020 A | * | 12/1997 | Noble ................. 280/28 |
| 5,964,311 A | | 10/1999 | Yamamoto et al. |
| 6,102,413 A | | 8/2000 | Khennache et al. |
| 6,267,392 B1 | | 7/2001 | Noble |
| 6,276,699 B1 | | 8/2001 | Simmons et al. |
| 6,378,889 B1 | | 4/2002 | Moriyama et al. |
| 6,431,561 B1 | | 8/2002 | Hedlund |
| 6,626,444 B2 | | 9/2003 | Noble |

(Continued)

FOREIGN PATENT DOCUMENTS

WO    WO 83/03554    10/1983

(Continued)

OTHER PUBLICATIONS http://www.snoparts.com/ski_skin.htm "Snowmobile Ski Skins" retrieved on Jul. 29, 2005.

(Continued)

*Primary Examiner*—Christopher P Ellis
*Assistant Examiner*—Bridget Avery
(74) *Attorney, Agent, or Firm*—Richard C. Litman

(57) ABSTRACT

The quad parabolic snowmobile ski is an elongated body having a top side, a bottom side, a tip at the front end, a rear end, a pair of symmetrically opposed ski parabolic cutting edges disposed longitudinally along the bottom of the ski, and a keel. The keel is attached to the bottom of the ski and has a central median ridge, i.e., a keel rail, a substantial portion of which protrudes below the bottom of the ski to form a central and longitudinal point of contact with the snow. The keel defines symmetrically opposed snow-funneling channels along the opposite sides of the central median ridge. Varying radii of curvature of the channels form parabolically-shaped channel outer sidewalls. Symmetrically opposed keel parabolic cutting edges are formed by contouring a keel body width to follow the contour of the parabolic shaped outer sidewalls at a constant cutting edge width.

20 Claims, 6 Drawing Sheets

U.S. PATENT DOCUMENTS

| | | | |
|---|---|---|---|
| 6,631,912 | B2 | 10/2003 | Metheny |
| 6,692,009 | B2 * | 2/2004 | Lemieux ........................ 280/28 |
| 6,857,653 | B2 | 2/2005 | Wilson |
| 7,232,134 | B2 * | 6/2007 | Ruzewski et al. ............. 280/28 |
| 2001/0032744 | A1 | 10/2001 | Moriyama |
| 2002/0105166 | A1 | 8/2002 | Lemieux |
| 2002/0149174 | A1 | 10/2002 | Cormican |
| 2003/0034619 | A1 | 2/2003 | Bergstrom |
| 2003/0189302 | A1 | 10/2003 | Makitalo |
| 2003/0234500 | A1 | 12/2003 | Roberts et al. |
| 2004/0051275 | A1 | 3/2004 | Haruna et al. |
| 2004/0061296 | A1 | 4/2004 | Metheny |
| 2004/0099458 | A1 | 5/2004 | Meunier |
| 2004/0262885 | A1 | 12/2004 | Wilson |

OTHER PUBLICATIONS http://www.ronnies.com/store/page169.html "Snowmobile/Ski & Steering/Ski Skins" retrieved on Jul. 29, 2005.

* cited by examiner

QUAD PARABOLIC SNOWMOBILE SKI

CROSS-REFERENCE TO RELATED APPLICATION

This application claims the benefit of U.S. Provisional Patent Application Ser. No. 60/729,744, filed Oct. 25, 2005.

BACKGROUND OF THE INVENTION

1. Field of the Invention

The present invention relates to skis and to snowmobiles, and more particularly to a quad parabolic snowmobile ski for steering a snowmobile.

2. Description of the Related Art

Skis have been used for transportation for centuries, including skis for attachment directly to the feet and skis for attachment to sleds, sleighs, and various other snow vehicles, including snowmobiles. Only within the last fifty years or so have these skis incorporated or included what have been referred to as wear or steering keel bars, runners, skags, and the like. A typical runner blade may be attached by studs to the bottom surface of a ski, with the front and rear ends of the bar bent to tuck into the bottom of the ski. This method of attachment is still popular today.

A wear, steering keel, or runner bar can perform several functions. As one name implies, a wear bar is used to lengthen the life of the under or bottom surface of the ski by focusing the contact or wear on the bar when in contact with the ground or hard surfaces. As a steering keel bar, the bar extends downwards, as in a watercraft, to stabilize and improve the steering responsiveness and capability of the ski. Skis with steering keel bars are now in commonplace usage as steering skis for snowmobiles. However, many present designs incorporating a steering keel still do not provide tight, precision, high performance level steering.

International Patent No. WO 83/03554, published Oct. 27, 1983, appears to disclose a wearable mono-ski with improved steering due to rear and front openings in the ski body. The '554 patent does not appear to address a ski appropriate for a snowmobile.

Thus, until now the lack of precision in turning capability has remained and often resulted in sloppy high speed turning characteristics that are evidenced by a plowing effect in a current direction of travel, rather than a controlled, turning effect in a steered direction. At high speeds, this effect can be dangerous and result in collision with objects in the path of the snowmobile even though the operator tries to steer around the objects.

Keel designers are continuously attempting to deal with this problem by modifying keel lengths and geometries to improve steering characteristics, yet maintain ease of steering from driver inputs. Nevertheless, the problem of precision, predictable and relatively effortless steering remains to be solved.

Thus, a snowmobile ski solving the aforementioned problems is desired.

SUMMARY OF THE INVENTION

The quad parabolic snowmobile ski is an elongated body comprised of a top side, a bottom side, a tip at the front end, a rear end, a pair of symmetrically opposed, ski parabolic cutting edges longitudinally disposed along the bottom of the ski, and a keel. The keel is attached to the bottom of the ski and has a central median ridge, i.e., a keel rail, a substantial portion of which protrudes below the bottom of the ski to form a central and longitudinal point of contact with the snow. Moreover, the keel comprises symmetrically opposed snow funneling channels along the left and right sides of the central median ridge.

Varying radii of curvature of the channels form parabolically shaped channel outer sidewalls. Symmetrically opposed keel parabolic cutting edges are formed by contouring a keel body width to follow the contour of the parabolically shaped outer sidewalls at a constant cutting edge width.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
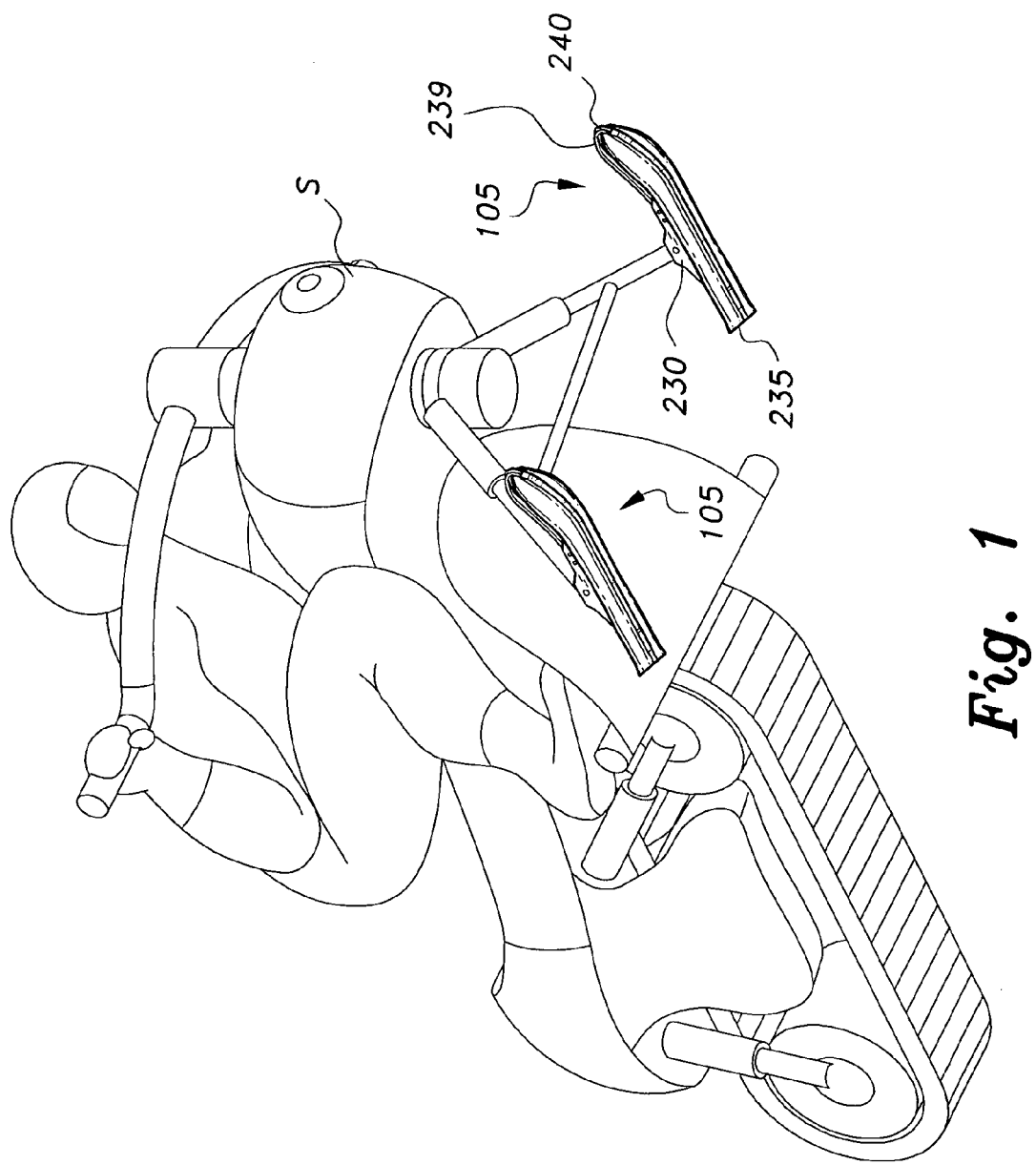
FIG. 1 is an environmental, perspective view of a quad parabolic snowmobile ski according to the present invention.

As shown in FIG. 1, the present invention is a quad parabolic snowmobile ski 105, which is an elongated body having a tip 240 at the front end, a rear end 235, and a strut attachment block 230 for attaching the ski 105 to a steering strut of snowmobile S. As most clearly shown in FIGS. 2 and 3, the ski 105 is further comprised of a top side 200, a bottom side 107, ski parabolic cutting edges 220, a grab handle 239, and a keel 202. Additionally, as shown in FIG. 2, the strut attachment block 230 is molded with, or otherwise fixedly attached to, the ski top 200.

Figure 2:
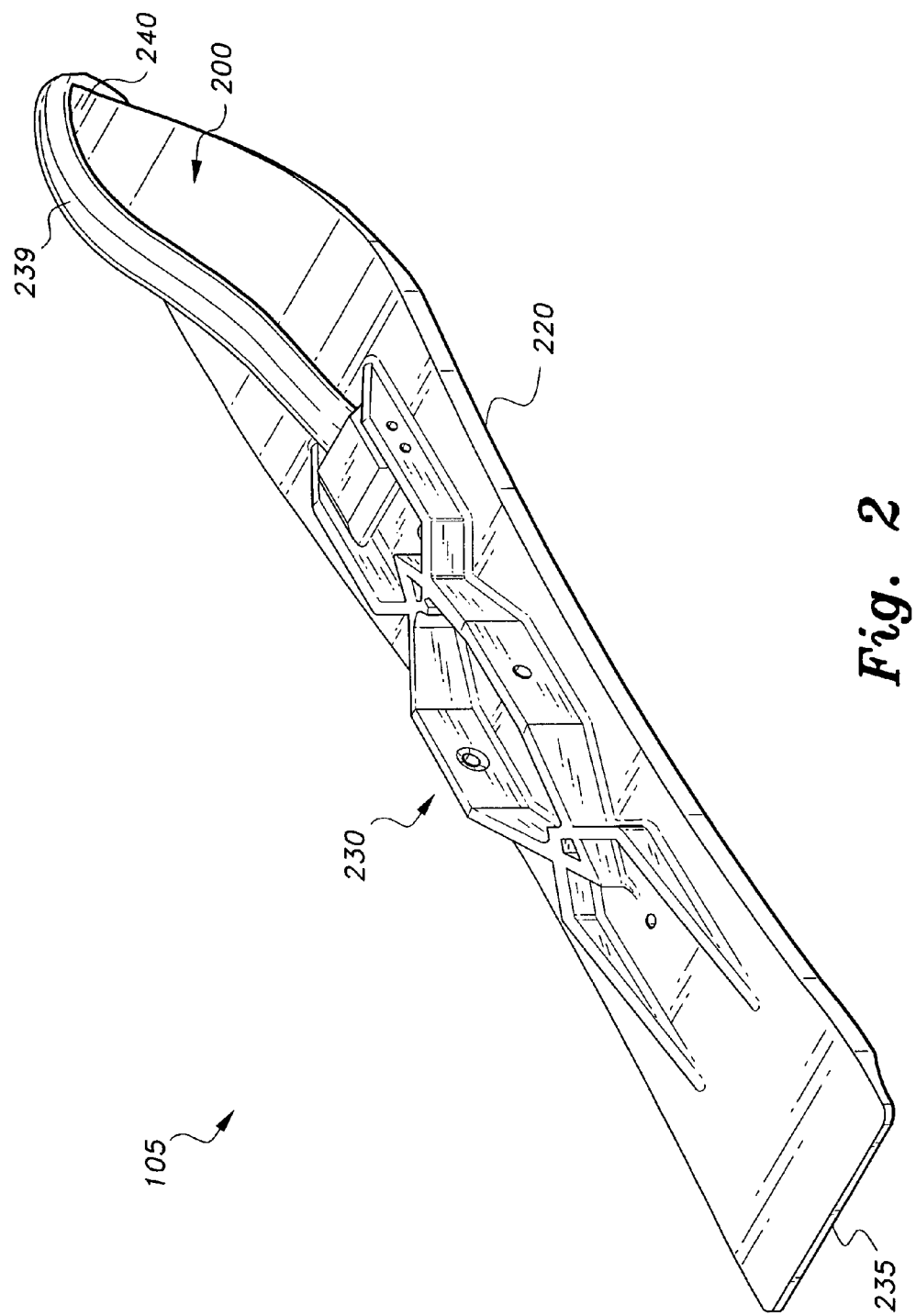
FIG. 2 is a top perspective view of the quad parabolic snowmobile ski according to the present invention.

As most clearly shown in FIG. 2, the grab handle 239 is an arcuate elongate member that extends from a front section of the strut attachment block 230 and wraps around the tip 240 of the ski 105. The grab handle 239 is provided to help a user grab onto the skis 105 when transporting them, removing them, or preparing them for attachment to the snowmobile S.

Figure 3:
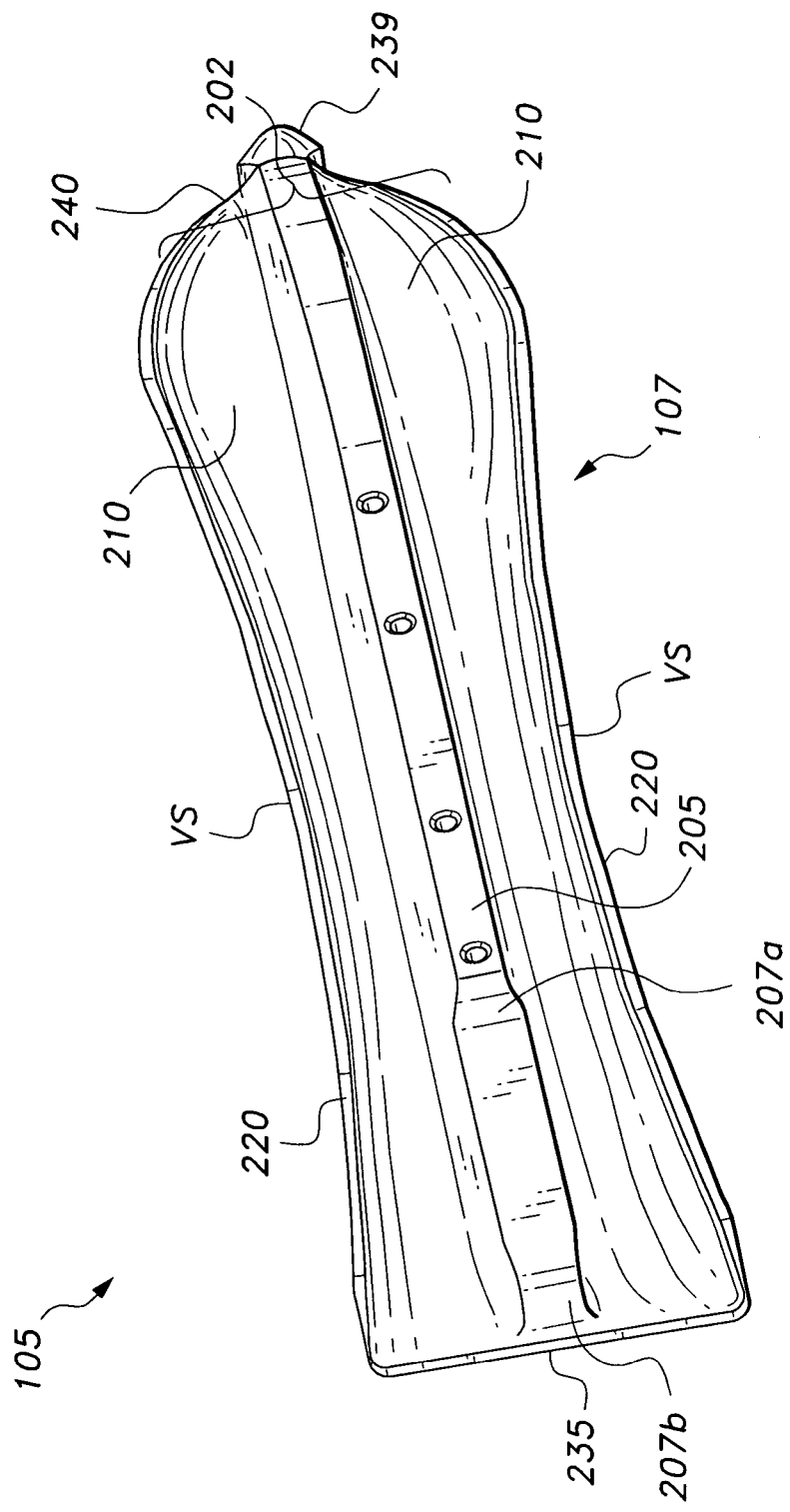
FIG. 3 is a bottom perspective view of the quad parabolic snowmobile ski according to the present invention.
Figure 5:
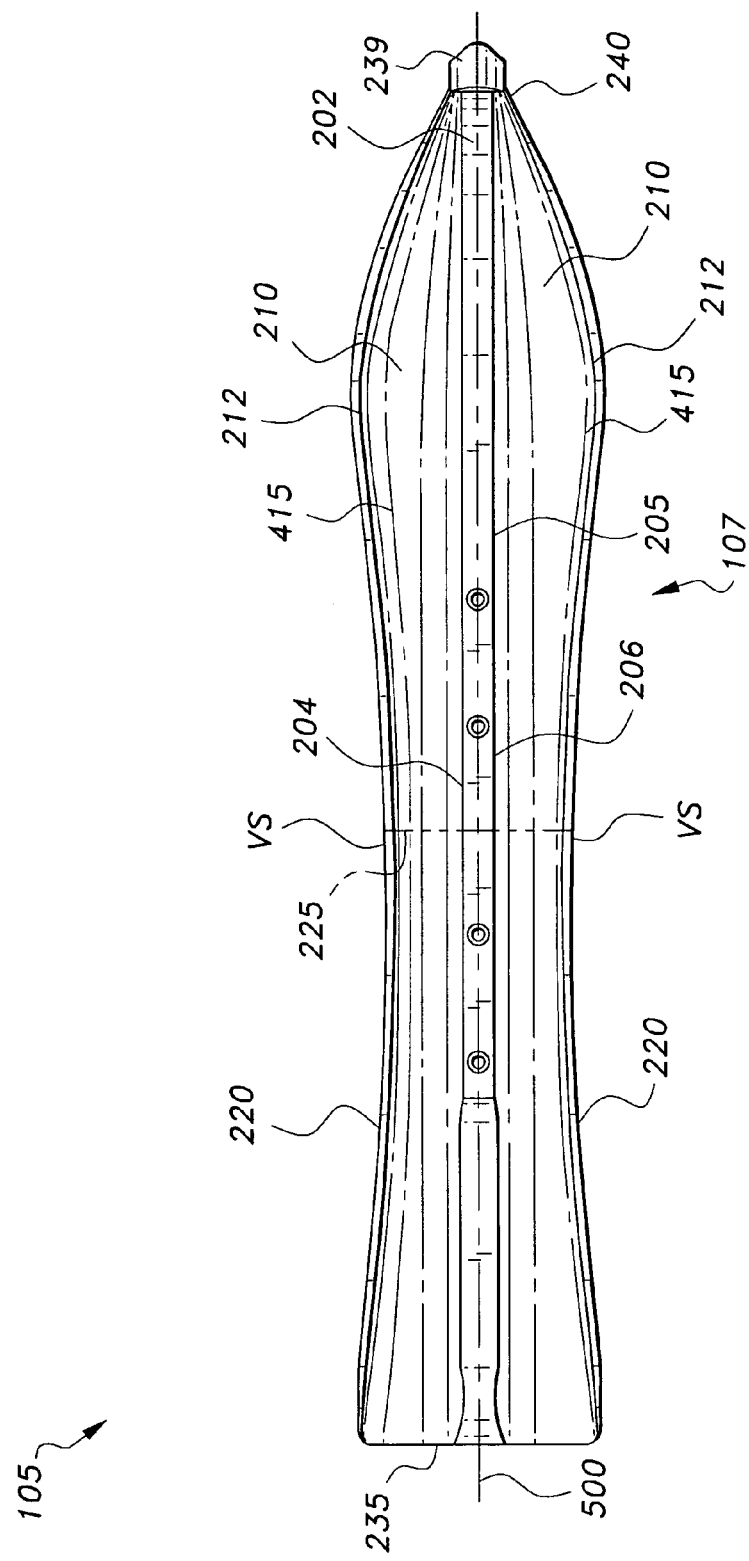
FIG. 5 is a bottom plan view of the quad parabolic snowmobile ski according to the present invention.

As illustrated in FIGS. 3 and 5, the ski parabolic cutting edges 220 are symmetrically opposed, being disposed longitudinally along the bottom 107 from a region near the front end tip 240 to a region near the rear end 235, and have vertices VS, i.e., parabolic curve minima, directed laterally towards a longitudinal axis 500 of the ski. Specific parabolic curve fitting parameters of the cutting edges 220 are preferably predetermined by modeling design template parabolic curves.

Figure 4:
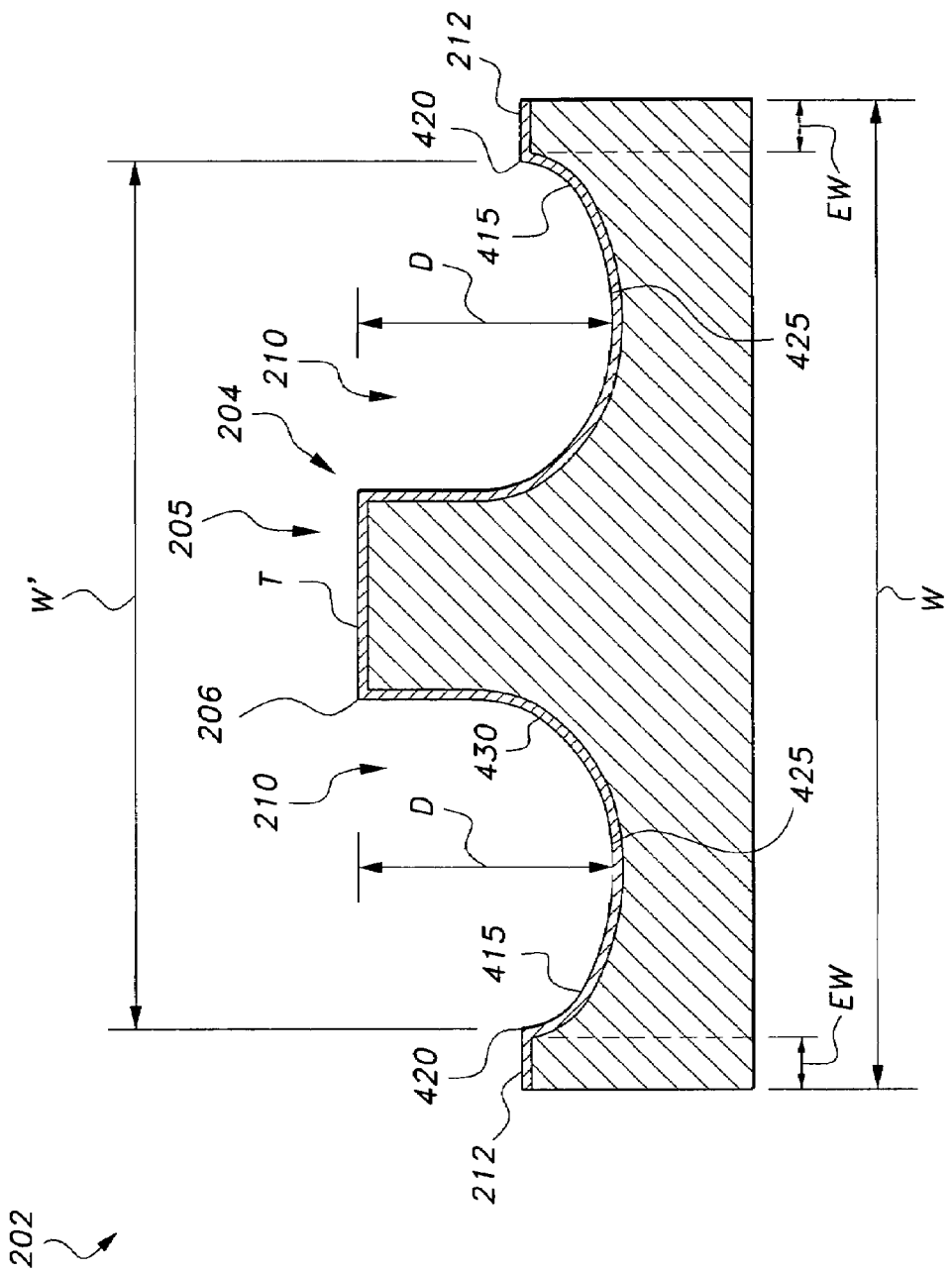
FIG. 4 is an inverted transverse section view of the ski keel of the quad parabolic snowmobile ski according to the present invention.

Additionally, as shown in FIGS. 3, 4 and 5, the keel 202 is attached or molded into the bottom 107 of the ski 105 and is disposed longitudinally, extending from a region near the front end tip 240 to a region near the rear end 235, so that a central median ridge, i.e., a keel rail 205, protrudes below the bottom 107 of the ski to form a central and longitudinal point of contact with the snow. Moreover, the keel 202 further comprises symmetrically opposed snow funneling channels 210 respectively disposed longitudinally along a first side 204 of the central median ridge 205 and along an opposing second side 206 of the central median ridge 205. Additionally, the keel rail 205 may have a first gradient 207a in its depth D disposed longitudinally proximate a rear section of the strut attachment block 230. The first gradient 207a is provided to lower an overall depth of the central median ridge, i.e., keel rail 205. A second gradient 207b may be provided proximate the rear end 235 to form a rear terminus of the keel rail 205.

As shown in FIG. 4, which depicts an inverted transverse section view of the keel 202, the channels 210 originate at the peak T of the central median ridge 205, extending laterally to the first side 204 and the second side 206, curving down and away from the central median ridge to form a channel depth D that extends from the peak T to a channel floor 425. From channel floor 425, the curvature of the channels 210 then curves up and terminates, forming outer sidewalls 415 having a height less than depth D of the central median ridge 205.

The radii of curvature of the symmetrically disposed channels 210, i.e., the curvature from the outer edges of the ski 105 towards the central ridge or keel rail 205, vary as a function of sidewall longitudinal displacement from the front end tip 240 to make the outer sidewalls 415 parabolically-shaped as seen in plan view so that, as shown in FIGS. 2 and 5, excluding the tip 240, they are laterally closest to each other at a center region 225 of the ski 105 and laterally farthest apart from each other longitudinally between the front end tip 240 and a front portion of the strut attachment block 230, as well as towards the rear end 235. Specific parabolic curve fitting parameters of the parabolically-shaped outer sidewalls 415 are preferably predetermined by modeling design template parabolic curves.

Symmetrically opposite, longitudinally disposed keel parabolic cutting edges 212 are formed by contouring the keel body width W to form a constant cutting edge width EW. The cutting edge width EW is substantially equal to W−W'. Since the keel parabolic cutting edges 212 follow the contour of the parabolically-shaped outer sidewalls 415, excluding the tip 240, the keel parabolic cutting edges 212 are laterally closest to each other at a center region 225 of the ski 105 and laterally farthest apart from each other between the front end tip 240 and a front portion of the strut attachment block 230, as well as towards the rear end 235.

Advantageously, the channels 210 provide a tunneling action of snow in contact with the keel 202 to reduce straight line travel friction. According to the present invention, the ski parabolic edges 220 work in conjunction with the keel parabolic cutting edges 212 to provide an aggressive cut for turning the snowmobile with ease and in a reliable manner. Before fabrication, tuning of the quad parabolic ski 105 steering characteristics may be achieved by adjusting parameters of the design template parabolic curves according to the equation: $Ax^2+Bxy+Cy^2+Dx+Ey+F=0$ so long as coefficient $B^2=4AC$.

Figure 6:
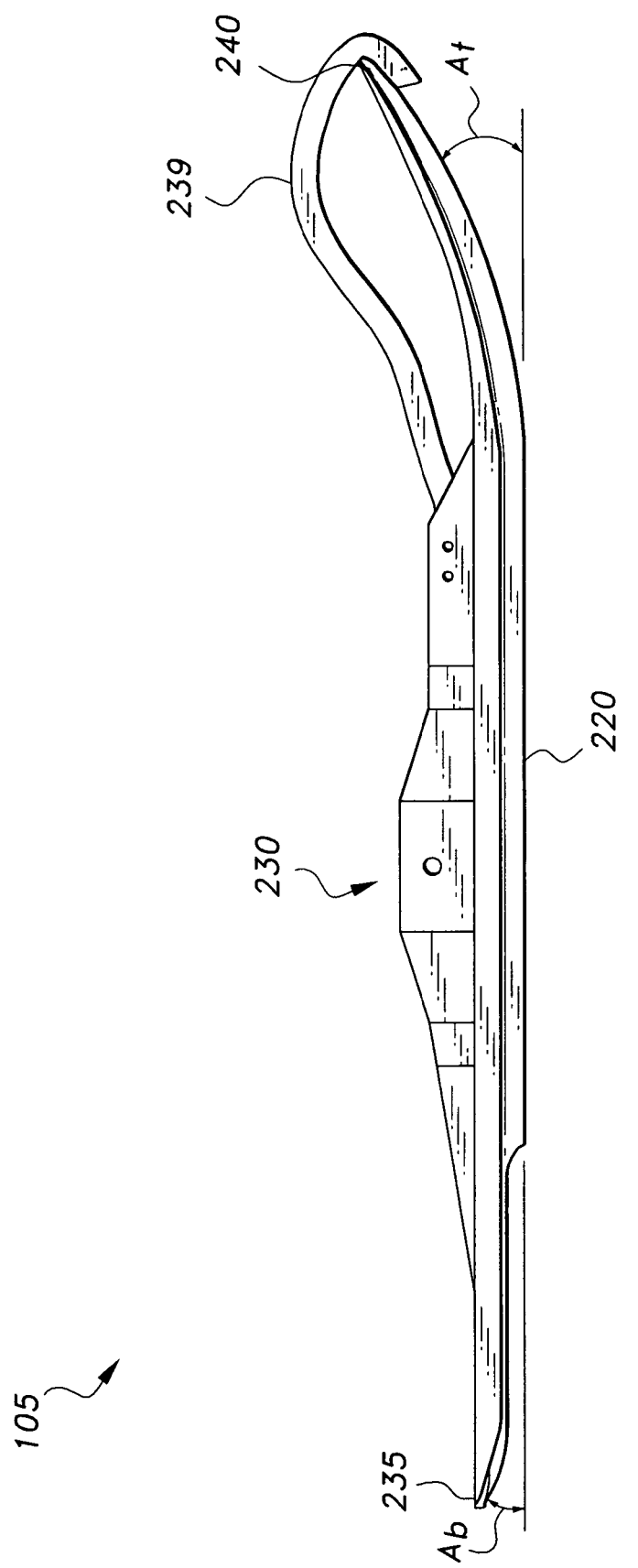
FIG. 6 is a side view of the quad parabolic snowmobile ski according to the present invention.

The quad parabolic ski 105 may preferably be fabricated from Ultra High Molecular Weight Polyethylene, i.e., UHMW plastic. Alternatively, the ski 105 may be fabricated from any other material or group of materials having light weight, high tensile strength, shatter resistance, and abrasion resistant properties. A flexible and durable coating 430 that is easily bonded to the ski components and having a low coefficient of surface friction may be applied in order to further reduce turning efforts from steering inputs applied by a snowmobile driver. As shown in FIG. 6, the front end tip 240 may have an upsweep angle $A_t$ between 0° and 90°. Similarly the rear end 235 may have an upsweep angle $A_b$ between 0° and 90°.

It is to be understood that the present invention is not limited to the embodiment described above, but encompasses any and all embodiments within the scope of the following claims.

I claim:

1. A snowmobile ski, comprising an elongated body having:
   a top side;
   a strut attachment block disposed on the top side;
   a bottom side;
   a front end forming a tip;
   a rear end;
   a pair of symmetrically opposed ski parabolic cutting edges formed on the bottom side; and
   a keel formed on the bottom side, the keel having a central median ridge extending from the bottom side to form a central and longitudinal point of contact with snow and symmetrically opposed snow-funneling channels defined along opposite sides of the central median ridge, the channels having varying radii of curvature to form outer sidewalls having parabolic shapes, the sidewalls, excluding the tip region, being laterally closest to each other at a center region of the elongated body and laterally farthest apart from each other between the tip and a front portion of the strut attachment block, as well as towards the rear end, the keel following the contour of the parabolic shaped outer sidewalls at a constant cutting edge width to form parabolic keel cutting edges, the parabolic cutting edges being disposed longitudinally along the bottom of the ski from a region near the front end tip to a region near the rear end, and having vertices directed laterally towards a longitudinal axis of the ski.

2. The snowmobile ski according to claim 1, wherein the central median ridge has a first gradient disposed longitudinally proximate a rear section of the strut attachment block, the gradient lowering depth of the central median ridge measured from the elongated body.

3. The snowmobile ski according to claim 1, wherein the central median ridge extends to a maximum channel depth below the elongated body.

4. The snowmobile ski according to claim 1, wherein the radii of curvature of the channels vary as a function of sidewall longitudinal displacement from the front end tip so that the outer sidewalls are parabolically-shaped.

5. The snowmobile ski according to claim 1, wherein the elongated body is composed of a high tensile strength, shatter resistant material.

6. The snowmobile ski according to claim 1, wherein the front end and the rear end of said elongated body are upturned.

7. The snowmobile ski according to claim 2, wherein the central median ridge has a second gradient disposed longitudinally proximate the rear end of the ski, whereby the depth of the central median ridge measured from the elongated body is lowered to form a rear terminus of the central median ridge.

8. The snowmobile ski according to claim 3, wherein the outer sidewalls extend downward a distance less than the channel depth from the elongate body.

9. The snowmobile ski according to claim 5, wherein the elongated body is composed of a lightweight material.

10. The snowmobile ski according to claim 5, wherein the elongated body is composed of an abrasion resistant material.

11. The snowmobile ski according to claim 5, further comprising a flexible, durable coating disposed on the elongated body, the coating having a low coefficient of surface friction to provide reduced turning effort from steering inputs during use of the ski.

12. A snowmobile ski, comprising an elongated body having:
- a top side;
- a strut attachment block disposed on the top side;
- a bottom side;
- a front end forming a tip; and
- a rear end, the elongated body having a parabolically-shaped lateral curvature extending from a region proximate the rear end to a region located longitudinally between the strut attachment block and the tip of the front end;
- a keel formed on the bottom side, the keel having a central median ridge extending from the bottom side to form a central and longitudinal point of contact with snow and symmetrically opposed snow-funneling channels along opposite sides of the central median ridge, the channels having varying radii of curvature to form outer sidewalls, the outer sidewalls following the lateral contour of the elongated body to form a pair of inner keel parabolic cutting edges and a pair of outer ski parabolic cutting edges.

13. The snowmobile ski according to claim 12, wherein the central median ridge has a first gradient disposed longitudinally proximate a rear section of the strut attachment block, the gradient lowering depth of the central median ridge measured from the elongated body.

14. The snowmobile ski according to claim 12, wherein the central median ridge extends to a maximum channel depth below the elongated body.

15. The snowmobile ski according to claim 12, wherein the radii of curvature of the channels vary as a function of sidewall longitudinal displacement from the front end tip so that the outer sidewalls are parabolically-shaped.

16. The snowmobile ski according to claim 12, wherein the front end and the rear end of said elongated body are upturned.

17. The snowmobile ski according to claim 12, wherein the elongated body is composed of a high tensile strength, shatter resistant material.

18. The snowmobile ski according to claim 12, further comprising a grab handle extending from a front section of the strut attachment block to wrap around the tip of the elongated body, the handle for grabbing onto the ski for transport, and for handling the ski when attaching the ski to, and removing the ski from, the snowmobile.

19. The snowmobile ski according to claim 13, wherein the central median ridge has a second gradient disposed longitudinally proximate the rear end of the ski, whereby the depth of the central median ridge measured from the elongated body is lowered to form a rear terminus of the central median ridge.

20. The snowmobile ski according to claim 14, wherein the outer sidewalls extend downward a distance less than the channel depth from the elongate body.

* * * * *